(12) United States Patent
Easter

(10) Patent No.: US 7,968,623 B2
(45) Date of Patent: Jun. 28, 2011

(54) TREE RESISTANT INSULATION COMPOSITIONS

(75) Inventor: Mark Easter, Indianapolis, IN (US)

(73) Assignee: General Cable Technologies Corp., Highland Heights, KY (US)

( * ) Notice: Subject to any disclaimer, the term of this patent is extended or adjusted under 35 U.S.C. 154(b) by 438 days.

(21) Appl. No.: 12/187,031

(22) Filed: Aug. 6, 2008

(65) Prior Publication Data

US 2009/0043012 A1    Feb. 12, 2009

Related U.S. Application Data

(60) Provisional application No. 60/935,309, filed on Aug. 6, 2007, provisional application No. 61/018,625, filed on Jan. 2, 2008.

(51) Int. Cl.
*H02G 15/00* (2006.01)

(52) U.S. Cl. ........................................ 523/173

(58) Field of Classification Search ............. 523/173
See application file for complete search history.

(56) References Cited

U.S. PATENT DOCUMENTS

| | | | |
|---|---|---|---|
| 4,622,350 A | 11/1986 | Icenogle et al. | |
| 4,622,352 A | 11/1986 | Djiaum et al. | |
| 5,047,482 A | 9/1991 | Schlag et al. | |
| 5,719,218 A | 2/1998 | Sarma | |
| 6,063,845 A | 5/2000 | Nylander | |
| 6,274,239 B1 | 8/2001 | Peruzzotti et al. | |
| 6,436,536 B2 | 8/2002 | Peruzzotti et al. | |
| 6,645,411 B2 | 11/2003 | Danekas et al. | |
| 6,858,296 B1 | 2/2005 | Mendelsohn et al. | |

FOREIGN PATENT DOCUMENTS

| | | |
|---|---|---|
| JP | 08222027 A | 8/1996 |
| JP | 15-082172 | 3/2003 |
| JP | 15-331652 A | 11/2003 |
| KR | 10-1992-0004784 B1 | 6/1992 |
| KR | 10-0718022 B1 | 5/2007 |
| KR | 10-0727207 B1 | 6/2007 |
| WO | 0222726 A2 | 3/2002 |
| WO | WO2005122185 | 12/2005 |
| WO | WO 2006114283 A1 | 11/2006 |

*Primary Examiner* — Edward J Cain

(74) *Attorney, Agent, or Firm* — Blank Rome LLP

(57) ABSTRACT

Insulation compositions for electric power cables having a polyolefin base polymer and an additive comprising either low molecular weight wax or polyethylene glycol (PEG) and optionally further comprising one or more hindered amine light stabilizers, amine antioxidants and other antioxidant blends are disclosed. Also disclosed are insulation compositions comprising a $C_2$ to $C_8$ alpha olefin in combination with a polyethylene homopolymer together with, optionally, one or more hindered amine light stabilizer and a liquid cresol antioxidant.

12 Claims, 1 Drawing Sheet

TREE RESISTANT INSULATION COMPOSITIONS

CLAIM OF PRIORITY

Figure 1:
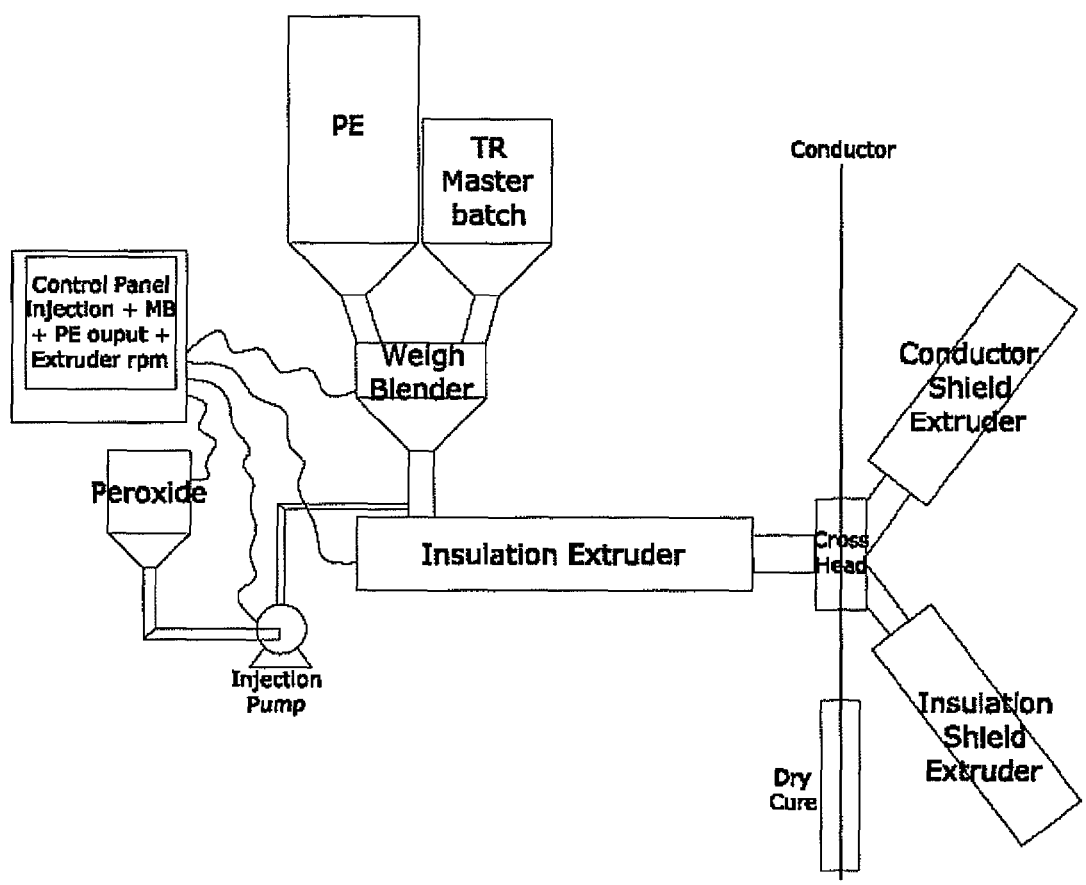

This application claims priority to U.S. Provisional Patent Application Nos. 60/935,309, filed Aug. 6, 2007, and 61/018,625, filed Jan. 2, 2008, the disclosures of which are hereby incorporated by reference herein.

FIELD OF THE INVENTION

The invention relates to insulation compositions for electric power cables having a polyolefin base polymer and an additive comprising either low molecular weight wax or polyethylene glycol (PEG) and optionally further comprising one or more hindered amine light stabilizers, amine antioxidants and other antioxidant blends. The invention also relates to an insulation composition comprising a $C_2$ to $C_8$ alpha olefin in combination with a polyethylene homopolymer together with, optionally, one or more hindered amine light stabilizer and a liquid cresol antioxidant.

BACKGROUND OF THE INVENTION

Typical power cables generally have one or more conductors in a core that is surrounded by several layers that can include: a first polymeric semiconducting shield layer, a polymeric insulating layer, a second polymeric semiconducting shield layer, a metallic tape shield and a polymeric jacket.

Polymeric materials have been utilized in the past as electrical insulating and semiconducting shield materials for power cables. In services or products requiring long-term performance of an electrical cable, such polymeric materials, in addition to having suitable dielectric properties, must be durable. For example, polymeric insulation utilized in building wire, electrical motor or machinery power wires, or underground power transmitting cables, must be durable for safety and economic necessities and practicalities.

One major type of failure that polymeric power cable insulation can undergo is the phenomenon known as treeing. Treeing generally progresses through a dielectric section under electrical stress so that, if visible, its path looks something like a tree. Treeing may occur and progress slowly by periodic partial discharge. It may also occur slowly in the presence of moisture without any partial discharge, or it may occur rapidly as the result of an impulse voltage. Trees may form at the site of a high electrical stress such as contaminants or voids in the body of the insulation-semiconductive screen interface. In solid organic dielectrics, treeing is the most likely mechanism of electrical failures which do not occur catastrophically, but rather appear to be the result of a more lengthy process. In the past, extending the service life of polymeric insulation has been achieved by modifying the polymeric materials by blending, grafting, or copolymerization of silane-based molecules or other additives so that either trees are initiated only at higher voltages than usual or grow more slowly once initiated.

There are two kinds of treeing known as electrical treeing and water treeing. Electrical treeing results from internal electrical discharges that decompose the dielectric. High voltage impulses can produce electrical trees. The damage, which results from the application of high alternating current voltages to the electrode/insulation interfaces, which can contain imperfections, is commercially significant. In this case, very high, localized stress gradients can exist and with sufficient time can lead to initiation and growth of trees. An example of this is a high voltage power cable or connector with a rough interface between the conductor or conductor shield and the primary insulator. The failure mechanism involves actual breakdown of the modular structure of the dielectric material, perhaps by electron bombardment. In the past much of the art has been concerned with the inhibition of electrical trees.

In contrast to electrical treeing, which results from internal electrical discharges that decompose the dielectric, water treeing is the deterioration of a solid dielectric material, which is simultaneously exposed to liquid or vapor and an electric field. Buried power cables are especially vulnerable to water treeing. Water trees initiate from sites of high electrical stress such as rough interfaces, protruding conductive points, voids, or imbedded contaminants, but at lower voltages than that required for electrical trees. In contrast to electrical trees, water trees have the following distinguishing characteristics; (a) the presence of water is essential for their growth; (b) no partial discharge is normally detected during their growth; (c) they can grow for years before reaching a size that may contribute to a breakdown; (d) although slow growing, they are initiated and grow in much lower electrical fields than those required for the development of electrical trees.

Electrical insulation applications are generally divided into low voltage insulation (less than 1 K volts), medium voltage insulation (ranging from 1 K volts to 69 K volts), and high voltage insulation (above 69 K volts). In low voltage applications, for example, electrical cables and applications in the automotive industry treeing is generally not a pervasive problem. For medium-voltage applications, electrical treeing is generally not a pervasive problem and is far less common than water treeing, which frequently is a problem. The most common polymeric insulators are made from either polyethylene homopolymers or ethylene-propylene elastomers, otherwise known as ethylene-propylene-rubber (EPR) or ethylene-propylene-diene ter-polymer (EPDM).

Polyethylene is generally used neat (without a filler) as an electrical insulation material. Polyethylenes have very good dielectric properties, especially dielectric constants and power factors. The dielectric constant of polyethylene is in the range of about 2.2 to 2.3. The power factor, which is a function of electrical energy dissipated and lost and should be as low as possible, is around 0.0002 at room temperature, a very desirable value. The mechanical properties of polyethylene polymers are also adequate for utilization in many applications as medium-voltage insulation, although they are prone to deformation at high temperatures. However, polyethylene homopolymers are very prone to water treeing, especially toward the upper end of the medium-voltage range.

There have been attempts to make polyethylene-based polymers that would have long-term electrical stability. For example, when dicumyl peroxide is used as a crosslinking agent for polyethylene, the peroxide residue functions as a tree inhibitor for some time after curing. However, these residues are eventually lost at most temperatures where electrical power cable is used. U.S. Pat. No. 4,144,202 issued Mar. 13, 1979 to Ashcraft, et al. discloses the incorporation into polyethylenes of at least one epoxy containing organosilane as a treeing inhibitor. However, a need still exists for a polymeric insulator having improved treeing resistance over such silane containing polyethylenes.

Unlike polyethylene, which can be utilized neat, the other common medium-voltage insulator, EPR, typically contains a high level of filler in order to resist treeing. When utilized as a medium-voltage insulator, EPR will generally contain about 20 to about 50 weight percent filler, most likely calcined clay, and is preferably crosslinked with peroxides. The presence of the filler gives EPR a high resistance against the propagation of trees. EPR also has mechanical properties, which are superior to polyethylene at elevated temperatures. EPR is also much more flexible than polyethylene which can be an advantage for tight space or difficult installation.

Unfortunately, while the fillers utilized in EPR may help prevent treeing, the filled EPR will generally have poor dielectric properties, i.e. a poor dielectric constant and a poor power factor. The dielectric constant of filled EPR is in the range of about 2.3 to about 2.8. Its power factor is on the order of about 0.002 to about 0.005 at room temperature, which is approximately an order of magnitude worse than polyethylene.

Thus, both polyethylenes and EPR have serious limitations as an electrical insulator in cable applications. Although polyethylene polymers have good electric properties, they have poor water tree resistance. While filled EPR has good treeing resistance and good mechanical properties, it has dielectric properties inferior to polyethylene polymers.

Hindered amine light stabilizers or "HAL"s are primarily used in clear plastic film, sheets or coatings to prevent degradation by light. HALs are used in unfilled polyethylene insulations. They are thought to prevent degradation caused by light emitted by tiny electrical discharges. U.S. Pat. No. 5,719,218 discloses an optically transparent polyethylene insulation formulation with a HALs where it is stated that the HALs are useful for the prevention of degradation of the insulation by water trees.

U.S. Pat. No. 4,302,849 to Kawasaki et al proposes the use of high molecular weight polyethylene glycol as a solution to electrical insulation deterioration in polyolefin polymers. This technology has become widely used in the electrical cable industry, however, it is over 25 years old and the need for more improved performance in additives for treeing resistance exists.

Numerous methods to improve the performance of cross linked polyethylene (XLPE) insulation against dielectric deterioration by water tree generation and growth have been described in the literature. U.S. Pat. No. 4,144,202 issued Mar. 13, 1979, to Ashcraft et al relates to the inhibition of water tree growth by use of certain organosilane compounds. U.S. Pat. No. 4,206,260 describes compositions containing an effective mount of an alcohol containing 6-24 carbon atoms as being an efficient water and electrical tree retardant insulation. German patent 2,737,430 discloses that certain alkoxysilanes act as tree retardant additives in polyethylene insulation. European patent 0,166,781, published Jan. 8, 1986 to Sumitomo Electric Industries Limited describes a blend of ethylene and vinyl acetate copolymer as a water tree retardant material. Certain aliphatic carboxylic acid derivatives when incorporated in suitable mounts in XLPE are also reported to suppress water tree growth. Japanese application 63-226,814 published Sep. 21, 1988 and Canadian application 2,039,894 published Oct. 6, 1992 to Sarma et al disclose an insulation composition comprising a low density PE in admixture with an ethylene-vinyl acetate-vinyl alcohol copolymer as a possible water tree retardant composition.

U.S. Pat. No. 5,719,218 to Sarma proposes for improved water tree resistance for an electrically insulating cross-linked polyethylene composition for use in high voltage electrical cables, the cross-linked polyethylene being obtained by cross-linking a composition consisting essentially of 98% of a low density, peroxide cross-linkable polyethylene, 1-2% of a terpolymer of ethylene, vinyl acetate and vinyl alcohol and at least 0.15% of a sterically hindered amine stabilizer. Commercial acceptance of this formulation has been limited.

Polymers containing peroxides are vulnerable to scorch, i.e., premature cross-linking occurring during the polymer extrusion process. Scorch causes the formation of discolored gel-like particles in the resin and leads to an undesired build up of extruder pressure during extrusion. A good stabilizer package for peroxide cross-linked polyethylene for medium and high voltage cable insulation should protect the polymer against scorch during cable extrusion and provide long term stability after the cable has been produced. Additionally, the cable quality would be negatively affected.

Consequently, a suitable stabilizer system should provide low scorch. In addition to protection from scorch, the stabilizer system has an additional function. After the cable is produced, it is in service for an extended period of time (service life; long term stability). Often, the service life exceeds the intrinsic maximum stability of the polymer. Consequently, stabilizers need to be added in order to assure a suitable service life. During the cross-linking step, the interaction of the stabilizer with the peroxide should be as low as possible to ensure an optimum cross-link density resulting in optimal mechanical properties. Cross-linking assists the polymer in meeting mechanical and physical requirements, such as improved thermal aging and reduced deformation under pressure. Consequently, the stabilizer system, while suppressing scorch during the compounding step (and counteracting the effect of peroxides), should also have as few interactions as possible with the peroxide in later stage of the cable manufacturing process. An excess of organic peroxide may be used to achieve the desired level of cure, but, as described in EP 1088851, this leads to a problem known as sweat out. Sweat out dust is an explosion hazard, may foul filters, and causes slippage and instability in the extrusion process.

Other properties, such as the solubility of the antioxidant in the polymer matrix, are also important. A high solubility of the antioxidants ensures a low level of blooming. Blooming may result in the generation of dust on the pellets, which can lead to health and environmental concerns. Additionally, additives that bloomed to the surface might physically be lost and become unavailable in the polymer matrix for their intended purpose. Consequently, a suitable stabilizer package should have sufficient solubility with the polymer matrix. Further, a low enough melting point is required. A low melting point ensures a good dispersion of the antioxidant in the polymer matrix. Insufficient dispersion leads to decreased performance of the additive in the polymer matrix. An additive with a melting point above the maximum processing temperature of the polymer (as determined by the peroxide) would result in a very poor dispersion of the additive in the polymer matrix. This is considered a substantial drawback. The most appropriate way to incorporate additives into the polymer would be in a liquid form. While the stabilizer system does not necessarily need to be a liquid at room temperature, it needs to melt at a low enough temperature to be easily filtered and added to the polymer in a liquid form. A liquid addition will have the further advantage in that the additive can be filtered, thereby increasing cleanliness. Increased cleanliness of the additive will further improve the cable quality. Consequently, it is desirable that the stabilizing system have a sufficiently low melting temperature and desired properties.

U.S. Pat. No. 3,954,907 discloses that vulcanizable ethylene polymer-based compositions, which are susceptible to scorching when processed at elevated temperatures, prior to vulcanization, and in the presence of certain organic peroxide compounds, can be protected against such scorching by the incorporation therein of monomeric vinyl compounds having a defined structure.

U.S. Pat. No. 5,530,072 discloses a process that is said to improve the modification efficiency of peroxides through the proper selection of anti-oxidant additives and control of the extrusion environment.

U.S. Pat. No. 6,103,374 (EP 0965999 A1) discloses a composition comprising: (a) polyolefin; (b) as a scorch inhibitor, 4,4'-thiobis(2-methyl-6-t-butyl phenol); 2j2'-thiobis(6-t-butyl-4-methylphenol); or mixtures thereof; (c) hydroquinone; a substituted hydroquinon; or mixtures thereof in an amount sufficient to control color formation; and (d) an organic peroxide.

U.S. Pat. No. 6,180,231 (EP 1041582) discloses a composition comprising: (a) polyethylene; (b) as a first scorch inhibitor, a substituted hydroquinone or 4,4-thiobis(2-t-butyl-5-methyl phenol); (c) as a second scorch inhibitor, distearyl disulfide; and (d) an organic peroxide. U.S. Pat. No. 6,180,706 (EP 0965998 A1) discloses a composition comprising: (a) a low density homopolymer of ethylene prepared by a high pressure process; (b) a scorch inhibitor selected from the group consisting of a substituted hydroquinone; 4,4'-thiobis(2-methyl-6-t-butylphenol); 2,2'-thiobis(6-t-butyl-4-methylphenol); and 4,4'-thiobis(2-t-butyl-5-methylphenol) in an amount of about 0.02 to about 0.07 part by weight of scorch inhibitor per 100 parts by weight of homopolymer; (c) a cure booster; and (d) an organic peroxide.

U.S. Pat. No. 6,187,858 discloses a composition comprising: (a) polyethylene; (b) as a first antioxidant, a thiobisphenol; (c) as a second antioxidant, a compound containing 3-(3,5-di-t-butyl-4-hydroxyphenyl)propionate in the molecule; (d) as a third antioxidant, distearyl thiodipropionate; and (e) an organic peroxide, with the proviso that each antioxidant is present in an amount of about 0.01 to the about 0.2 part by weight and the organic peroxide is present in an amount of about 0.5 to about 3 parts by weight, all per 100 parts by weight of polyethylene.

U.S. Pat. No. 6,191,230 discloses a masterbatch composition comprising: (a) a copolymer of ethylene and 1-octene prepared with a metallocene catalyst; (b) a scorch inhibitor of a substituted hydroquinone; 4,4'-thiobis(2-methyl-6-t-butylphenol); 4,4'-thiobis(2-t-butyl-5-methylphenol); or mixtures thereof; (c) a cure booster, triallyl trimellitate; 3,9-divinyl-2,4,8,10-tetra-oxaspiro[5.5]undecane; triallylcyanurate; triallyl isocyanurate; or mixtures thereof; and (d) an organic peroxide.

U.S. Pat. No. 6,869,995 discloses a composition comprising: (i) polyethylene, and, based on 100 parts by weight of component (i), (ii) about 0.3 to about 0.6 part by weight of 4,4'-tbiobis(2-inethyl-6-t-butylphenol); 4,4'-thiobis(2-t-butyl-5-methylphenol); 2,2'-thiobis(6-t-butyl-4-methylphenol); or a mixture of said compounds, and (iii) about 0.4 to about 1 part by weight of a polyethylene glycol having a molecular weight in the range of about 1,000 to about 100,000.

U.S. Published Patent Application No. 2005/0148715 discloses a process for preparing a composition comprising the step of selecting a composition for preparing a moldable, test plaque having (1) a MDR tsl at 150 degrees Celsius of at least about 20, (2) a MDR tsl at 140 degrees Celsius of at least about 50, (3) a retention of tensile strength of at least about 75% after two weeks of aging at 150 degrees Celsius, (4) a retention of elongation of at least about 75% after two weeks of aging at 150 degrees Celsius, (5) water tree resistance less than about 45%, and (6) sweatout of less than about 100 ppm of the thiobis phenolic antioxidant and (b) imparting water tree resistance to the insulation of cables, the composition comprising: (i) polyethylene, and based on 100 parts by weight of component (i), (ii) about 0.3 to about 0.6 part by weight of a thiobis phenolic antioxidant selected from the group consisting of 4,4'-thiobis(2-methyl-6-t-butylphenol); 4,4'-thiobis(2-t-butyl-5-methylphenol); 2,2'-thiobis(6-t-butyl-4-methylphenol); or a mixture of said compounds; and (iii) about 0.4 to about 1 part by weight of a polyethylene glycol having a molecular weight in the range of about 1000 to about 100,000.

EP 1074580 discloses the use of [1,3,5-tris(4-tert-butyl-3-hydroxy-2,6-dimethylbenzyl)-1,3,5-triazine-2,4,6-(1H,3H,5H)-trione] as a scorch inhibitor in the technical field of preparation of cable insulation, semi-conductive shields, and jackets. EP 1088851 discloses the use of α-tocopherol as a scorch inhibitor.

EP 1249845 discloses the use of 2,4-bis(n-octylthiomethyl)-6-methylphenol as an antioxidant for a peroxide crosslinked polyethylene composition used as insulating material for medium and high voltage cables. EP 1249845 also discloses the combination of: a polyethylene; a scorch inhibitor having a melting point below 50° C. at atmospheric pressure; and an organic peroxide. The use of 4,6-bis(octylthiomethyl)o-cresol, as a scorch inhibitor is disclosed along with other structurally related compounds. JP 57-126833 discloses related compounds.

WO 00/02207 discloses peroxide cross-linked polyethylene as an insulating layer for wire and cable purposes that can be stabilized by a two component system based on 2,2'thiodiethylene bis[3(3,5-di-butyl-4-hydroxyphenyl)propionate] (IT) and distearyl 3,3'-thiopropionate (JE), usually at a total loading of about 0.4% total in a 1:1 ratio. It is also disclosed that a single stabilizer approach can be used, more particularly one with combined phenol and sulfur functionality, such as 4,4'-thiobis(2-t-butyl-5-methylphenol).

The use of antioxidant combinations is possible, but only a few of these combinations can meet the desired combination of properties that are required for an insulating material for medium voltage and high voltage power cable comprising, good anti-scorch, limited interaction with the peroxide during cross-linking, good long term stability, good solubility, a low melting point, and good color.

A good overview of the various polyethylene types is given in "Handbook of Polyethylene" by A. J. Peacock (Marcel Dekker Publishers, 2000). A more specific description of suitable polyethylenes is given in U.S. Published Patent Application No. 2005/0148715 A1 (page 2 paragraph [0017] to page 3 paragraph [0023]).

Therefore, a need exists in the electrical cable industry for an additive system that improves the tree resistance performance of polyolefin polymers as an electrical insulation composition.

SUMMARY OF THE INVENTION

The invention provides an insulation composition for electric cable comprising (a) a base polymer comprising polyolefin, (b) an additive comprising a blend of; (i) at least one amine antioxidant, and (ii) at least one hindered amine light stabilizer, and (iii) polyethylene glycol. In further embodiments of the present invention, the composition may optionally comprise an antioxidant mixture of (i) at least one fast radical scavenger selected from the group consisting of: low hindered phenols, low hindered thiophenols, low hindered thiobisphenols, aliphatic amines, aromatic amines, NOR HALS, hydroxylamines, and mixtures thereof; and (ii) at least one long term stabilizer selected from the group consisting of: low hindered phenols, highly hindered phenols, thio-synergists, aliphatic amines, aromatic amines, HALS, hydroxylamines, and mixtures thereof. Surprisingly these antioxidants and radical scavengers give improved tree resistance over other combinations known in the art.

In other embodiments the invention provides an insulation composition for electric cable comprising: (a) a base polymer comprising polyolefin; (b) an additive comprising; (i) a low molecular weight EVA wax and optionally at least one hindered amine light stabilizer and/or at least one amine antioxidant alone or in combination with the above antioxidant mixtures.

In preferred embodiments of the invention the base polymer comprises Zeigler Natta low density polyethylene, and/or Zeigler Natta linear low density polyethylene. The additive may be from about 0.5% to about 4.0% by weight of said composition preferably from about 1.0% to about 2.5% by weight of said composition.

In still further embodiments, the invention provides an insulation composition for an electric cable comprising: a base polymer comprising a $C_2$ to $C_8$ alpha olefin in combination with a polyethylene homopolymer together with, optionally, one or more hindered amine light stabilizers and other processing additives.

DETAILED DESCRIPTION OF THE DRAWING

FIG. 1 shows a schematic for a peroxide injection system.

DETAILED DESCRIPTION OF THE INVENTION

The invention particularly relates to polymeric compositions utilizing polyolefins, which compositions have a unique combination of good mechanical properties, good dielectric properties, and good water treeing resistance. The products are extremely useful as insulation compositions for electric power cables.

The polymers utilized in the protective jacketing, insulating, conducting or semiconducting layers of the inventive cables of the invention may be made by any suitable process which allows for the yield of the desired polymer with the desired physical strength properties, processability and electrical properties.

Base Polymer

The base polymer in accordance with the invention comprises at least one polyolefin polymer.

In embodiments of the invention the polyolefin base polymer is prepared using a conventional Ziegler-Natta catalyst. In preferred embodiments of the invention the polyolefin base polymer is selected from the group consisting of a Ziegler-Natta polyethylene, a Ziegler-Natta polypropylene, a copolymer of Ziegler-Natta polyethylene and Ziegler-Natta polypropylene, and a mixture of Ziegler-Natta polyethylene and Ziegler-Natta polypropylene. In more preferred embodiments of the invention the base polymer polyolefin is a Ziegler-Natta low density polyethylene (LDPE) or a Ziegler-Natta linear low density polyethylene (LLDPE) or a combination of a Ziegler-Natta LDPE and a Ziegler-Natta LLDPE.

In other embodiments of the invention the polyolefin base polymer is prepared using a metallocene catalyst. Alternatively, the polyolefin base polymer is a mixture or blend of Ziegler-Natta base polymer and metallocene base polymer.

The base polymer utilized in the insulation composition for electric cable in accordance with the invention may also be selected from the group of polymers consisting of ethylene polymerized with at least one co-monomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

The base polymer utilized in the insulation composition for electric cables in accordance with the invention may also be selected from the group of polymers consisting of either ethylene/alpha-olefin copolymers or ethylene/alpha-olefin/diene terpolymers. The polyene utilized in the invention generally has about 3 to about 20 carbon atoms. Preferably, the polyene has in the range of about 4 to about 20 carbon atoms, most preferably in the range of about 4 to about 15 carbon atoms. Preferably, the polyene is a diene, which can be a straight chain, branched chain, or cyclic hydrocarbon diene. Most preferably, the diene is a non conjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Of the dienes typically used to prepare EPR's, the particularly preferred dienes are 1,4-hexadiene, 5-ethylidene-2-norbornene, 5-vinylidene-2-norbornene, 5-methylene-2-norbornene and dicyclopentadiene. The especially preferred dienes are 5-ethylidene-2-norbornene and 1,4-hexadiene.

As an additional polymer in the base polymer composition, a non-metallocene base polymer may be used having the structural formula of any of the polyolefins or polyolefin copolymers described above. Ethylene-propylene rubber (EPR), polyethylene, polypropylene may all be used in combination with the Zeigler Natta and/or metallocene polymers in the base polymer.

In embodiments of the invention, the insulation composition base polymer comprises 30% to 50% by weight Zeigler Natta polymer or polymers and 50% to 70% by weight metallocene polymer or polymers The total amount of additives in the treeing resistant "additive package" are from about 0.5% to about 4.0% by weight of said composition, preferably from about 1.0% to about 2.5% by weight of said composition.

Zeigler Natta Polymers

A number of catalysts have been found for the polymerization of olefins. Some of the earliest catalysts of this type resulted from the combination of certain transition metal compounds with organometallic compounds of Groups I, II, and III of the Periodic Table. Due to the extensive amounts of early work done by certain research groups many of the catalysts of that type came to be referred to by those skilled in the area as Ziegler-Natta type catalysts. The most commercially successful of the so-called Ziegler-Natta catalysts have heretofore generally been those employing a combination of a transition metal compound and an organoaluminum compound.

Metallocene Polymers

Metallocene polymers are produced using a class of highly active olefin catalysts known as metallocenes, which for the purposes of this application are generally defined to contain one or more cyclopentadienyl moiety. The manufacture of metallocene polymers is described in U.S. Pat. No. 6,270,856 to Hendewerk, et al, the disclosure of which is incorporated by reference in its entirety.

Metallocenes are well known especially in the preparation of polyethylene and copolyethylene-alpha-olefins. These catalysts, particularly those based on group IV transition metals, zirconium, titanium and hafnium, show extremely high activity in ethylene polymerization. Various forms of the catalyst system of the metallocene type may be used for polymerization to prepare the polymers used in this invention, including but not limited to those of the homogeneous, supported catalyst type, wherein the catalyst and cocatalyst are together supported or reacted together onto an inert support for polymerization by a gas phase process, high pressure process, or a slurry, solution polymerization process. The metallocene catalysts are also highly flexible in that, by manipulation of the catalyst composition and reaction conditions, they can be made to provide polyolefins with controllable molecular weights from as low as about 200 (useful in applications such as lube-oil additives) to about 1 million or higher, as for example in ultra-high molecular weight linear polyethylene. At the same time, the MWD of the polymers can be controlled from extremely narrow (as in a polydispersity of about 2), to broad (as in a polydispersity of about 8).

Exemplary of the development of these metallocene catalysts for the polymerization of ethylene are U.S. Pat. No. 4,937,299 and EP-A-0 129 368 to Ewen, et al., U.S. Pat. No. 4,808,561 to Welborn, Jr., and U.S. Pat. No. 4,814,310 to Chang, which are all hereby are fully incorporated by reference. Among other things, Ewen, et al. teaches that the structure of the metallocene catalyst includes an alumoxane, formed when water reacts with trialkyl aluminum. The alumoxane complexes with the metallocene compound to form the catalyst. Welborn, Jr. teaches a method of polymerization of ethylene with alpha-olefins and/or diolefins. Chang teaches a method of making a metallocene alumoxane catalyst system utilizing the absorbed water in a silica gel catalyst support. Specific methods for making ethylene/alpha-olefin copolymers, and ethylene/alpha-olefin/diene terpolymers are taught in U.S. Pat. No. 4,871,705 (issued Oct. 3, 1989) and U.S. Pat. No. 5,001,205 (issued Mar. 19, 1991) to Hoel, et al., and in EP-A-0 347 129 published Apr. 8, 1992, respectively, all of which are hereby fully incorporated by reference.

Tree Resistant Additives or "Additive Package"

As described above, the additive or "additive package" in accordance with the one embodiment of the invention comprises a blend of; (i) at least one amine antioxidant, (ii) at least one hindered amine light stabilizer, and (iii) PEG.

In alternate embodiments of the invention, the additive or additive package in accordance with the invention comprises (i) a low molecular weight copolymer wax selected from the group consisting of ethylene vinyl acetate copolymers, ethylene alkyl acrylate copolymers wherein the alkyl group is selected from $C_1$ to $C_6$ hydrocarbons, ethylene alkyl methacrylate copolymers wherein the alkyl group is selected from $C_1$ to $C_6$ hydrocarbons and ethylene alkyl acrylate alkyl methacrylate terpolymers wherein the alkyl group is independently selected from C1 to C6 hydrocarbons. The copolymer wax will have a weight average molecular weight greater than about 10,000 daltons, preferably greater than about 12,000, and more preferably greater than about 15,000. A preferred ethylene vinyl acetate copolymer will have a weight average molecular weight from about 15,000 to about 50,000 and an even more preferred EVA copolymer will have a weight average molecular weight from about 20,000 to about 40,000. The low molecular weight EVA wax additive package may further comprise antioxidants and stabilizers. In a preferred embodiment the additive package may comprise (ii) at least one hindered amine light stabilizer and/or (iii) at least one an amine antioxidant.

Hindered Amine Light Stabilizer

Any suitable hindered amine light stabilizer may be used in accordance with the invention, for example, Bis(2,2,6,6-tetramethyl-4-piperidyl)sebaceate (tinuvin 770); Bis (1,2,2,6,6-tetramethyl-4-piperidyl) sebaceate+methyl 1,2,2,6,6-tetramethyl-4-piperidyl sebaceate(tinuvin 765); 1,6-Hexanediamine, N,N'-Bis(2,2,6,6-tetramethyl-4-piperidyl) polymer with 2,4,6 trichloro-1,3,5-triazine, reaction products with N-butyl 2,2,6,6-tetramethyl-4-piperidinamine (Chimassorb 2020); Decanedioic acid, Bis(2,2,6,6-tetramethyl-1-(octyloxy)-4-piperidyl)ester, reaction products with 1,1-dimethylethylhydroperoxide and octane (Tinuvin 123); Triazine derivatives (tinuvin NOR 371); Butanedioic acid, dimethylester 4 hydroxy-2,2,6,6-tetramethyl-piperidine ethanol (Tinuvin 622), 1,3,5-Triazine-2,4,6-triamine,N,N'''-[1,2-ethane-diyl-bis [[[4,6-bis-[butyl(1,2,2,6,6pentamethyl-4-piperdinyl)amino]-1,3,5-triazine-2-yl]imino]-3,1-propanediyl]]bis[N',N''-dibutyl-N',N''bis(2,2,6,6-tetramethyl-4-piperidyl) (Chimassorb 119). Chimassorb 944 LD and Tinuvin 622 LD are preferred hindered amine light stabilizers.

Amine Antioxidant

Any suitable amine antioxidant may be used in accordance with the invention, for example, 1,2-dihydro-2-2-4, octylated diphenylamine, diphenyl-p-phenylene-diamine, trimethylquinoline, 4,4'-di(1,1-dimethylbenzyl)-diphenylamine, ethoxy-1,2-dihydro-2-2-4 trimethylquinoline, p,p'-dioctyl-diphenylamine, 2-tert-butylhydroquinone 127 C melting point & 166 MW, N-(1,3-dimethyl butyl)-N'-phenyl-p-phenylene diamine, N-phenyl-N'isopropyl-p-phenylene diamine, p-phenylene diamine, Agerite MA, Agerite D, Flectol TMQ, Agerite Stelite 257 TGA onset, Stalite S 299 TGA onset, Vulcanox OCD, Agerite DPPD 276 TGA onset & 150 C melting point, Ethanox 703, Naugard PAN6, liquid Santaflex AW, Wingstay 29, Vanox 12, Vulcanox 4020 melting point 45 C, Dusantox 6PPD, Permanax 6PPD, Vulcanox 4010 melting point 75 C, Rhenogran IPPD-80, Flexzone 3-C, Uniroyal A/O PD-1, Dusantox IPPD, Wingstay 100 and Wingstay 200. Trimethylquinoline is a preferred amine antioxidant.

PEG

The use of high-molecular weight polyethylene glycol ("PEG") as an additive to prevent treeing in polyolefin insulation compounds is disclosed in U.S. Pat. No. 4,305,849, which is incorporated herein by reference. In embodiments of the invention the polyethylene glycol has more than 44 carbon atoms and has a molecular weight from about 1,000 to about 30,000 daltons.

Fillers

The insulating composition the invention may contain filler. An illustrative example of a suitable filler is clay, talc (aluminum silicate or magnesium silicate), magnesium aluminum silicate, magnesium calcium silicate, calcium carbonate, magnesium calcium carbonate, silica, ATH, magnesium hydroxide, sodium borate, calcium borate, kaolin clay, glass fibers, glass particles, or mixtures thereof. In accordance with the invention, the weight percent range for fillers is from about 10 percent to about 40 percent, preferably from about 20 to about 30 weight percent filler.

Low Molecular Weight Wax

In alternate embodiments of the invention, the additive or additive package in accordance with the invention comprises (i) a low molecular weight copolymer wax selected from the group consisting of ethylene vinyl acetate copolymers, ethylene alkyl acrylate copolymers wherein the alkyl group is selected from C1 to C6 hydrocarbons, ethylene alkyl methacrylate copolymers wherein the alkyl group is selected from C1 to C6 hydrocarbons and ethylene alkyl acrylate alkyl methacrylate terpolymers wherein the alkyl group is independently selected from C1 to C6 hydrocarbons. The copolymer wax will have a weight average molecular weight greater than about 10,000 daltons, preferably greater than about 12,000, and more preferably greater than about 15,000. A preferred ethylene vinyl acetate copolymer will have a weight average molecular weight from about 15,000 to about 50,000 and an even more preferred EVA copolymer will have a weight average molecular weight from about 20,000 to about 40,000. and is a measure of the distribution of the molecular weights of the polymer chains. The proportion of vinyl acetate in the low molecular weight EVA wax compounds of the invention should be about 5 to 20 percent, preferably about 8 to 18 and even more preferably about 12 to 15 percent vinyl acetate. Suitable commercially available material includes AC 400, a 12 percent vinyl acetate wax available from Honeywell Inc. of Morristown, N.J.

Other Antioxidant Mixtures

In certain embodiments of the present invention, the insulation compositions may contain an antioxidant mixture comprising at least one fast radical scavenger and at least one long term stabilizer. When present, it is preferable that the load level of fast radical scavengers, is 100 to 5,000 ppm, more preferably 500 to 4,000 ppm, based on the weight of the polyolefin. When present, it is preferable that the load level of the long term stabilizer(s), is 100 to 8,000 ppm, more preferably 500 to 6,000 ppm, based on the weight of the polyolefin. Most preferably, the total load level of the mixture of antioxidants is in the range of 200 to 10,000 ppm, preferably 2,000 to 6,000 ppm, based on the weight of the polyolefin.

Preferably, the fast radical scavenger(s), is (are) selected from the following groups:

[1] α-tocopherol, β-tocopherol, γ-tocopherol, δ-tocopherol, derivatives and mixtures thereof;

[2] sulfur containing phenolics, such as 4,6-bis(octylthiomethyl)-o-cresol, 2,4-bis(alkylthiomethyl)-6-methylphenols, 2,6-dialkyl-4-alkylthiomethylphenols(B), 4-alkyl-2,6-bis(alkylthiomethyl)phenols.4,6-bis(octylthiomethyl)o-cresol, their derivatives and mixtures thereof;

[3] 4,4'-thiobis(2-methyl-6-t-butylphenol), 4,4'-thiobis(2-t-butyl-5-methylphenol); 2,2'-thiobis(6-t-butyl-4methylphenol); 2,2'-thiobis 4-octyl phenol; and mixtures thereof;

[4] mixtures of 4,4'-thiobis(2-t-butyl-5-methylphenol) with triethylene glycol bis[3-[3,5-t-butyl-4-hydroxy-5-methylphenyl)propionate;

[5] 1,3,5-tris(4-tert-butyl-3-hydroxy-2,6-dimethylbenzyl)-1,3,5-triazine-2,4,6-(1H,3H,5H)-trione;

[6] 2,5-di-t-amylhydroquinone;

[7] reaction products of 4-methyiphenol with dicyclopentadiene and isobutylene;

[8] oxidized bis(hydrogenated tallow alkyl amines and derivatives thereof;

[9] bis-(1-octyloxy-2,2,6,6 tetramethyl-4-piperidinyl)sebacate;

[10] 4,4'-bis(α,α-dimethylbenzyl)diphenylamine, N-phenyl-styrenated benzenamine, diphenylamine/acetone reaction product, p-(p-toluene-sulfonylamido)-diphenylarnine, and mixtures thereof.

[11] 2,2-thiodiethylene bis[3(3-t-butyl-4-hydroxy-5 methylphenyl)propionate]; 2,2-thiodiethylene bis[3(3,5-di-methyl-4-hydroxyphenyl)propionate]; and derivatives and mixtures thereof with the long term stabilizers of group 1 below; and

[12] degradation and fragmentation products containing functional phenolic groups of 1 to 6 or 10. It is also contemplated that mixtures of any of the foregoing can also be used. Further fast radical scavengers are listed in "Rubber Technology Handbook" by W. Hofmann, Hanser Publishers (1989).

Preferably, the long term stabilizer(s), is (are) selected from the following groups:

[1] 2,2-thiodiethylene bis[3(3,5-di-t-butyl-4-hydroxyphenyl)propionate];

[2] tetrakismemylene(3,5-di-t-butyl-4-hydroxyhydrocinnamate)methane;

[3] octadecyl 3-(3',5'-di-t-butyl-4-hydroxy-phenyl)propionate; $C_9$-$C_{21}$ linear and branched alkyl esters of 3-(3',5'-di-t-butyl-4-hydroxyphenyl)propionic acid; $C_n$-$C_{15}$ linear and branched alkyl esters of 3-(3',5'-di-t-butyl-4-hydroxyphenyl) propionic acid;

[4] 1,3,5-tris(3,5-di-t-butyl-4-hydroxybenzyl)isocyanurate; 1,3,5-trimethyl-2,4,6-tris(3,5-di-t-butyl-4-hydroxybenzyl)benzene; N,N'-hexamethylene bis[3-(3,5-di-t-butyl-4-hydroxy-phenyl)-propionamide]; 1'-bis(3,5-di-t-butyl-4-hydroxyhydrocinnanioyl)hydrazine;

[5] Sterically hindered amines, as well as the N compounds thereof (e.g., N-alkyl, N-hydroxy, N-alkoxy, and N-acyl), such as bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl) n-butyl 3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethylpiperidin-4-yl)hexamethylenediamine and 4-tert-octylamino-2,6-dichloro-1,3,5-triazine, txis(2,2,6,6-tetramethylpiperidin-4-yl)nitrilotriacetate, tetrakis(2,2,6,6-tetramethylpiperidin-4-yl)-1,2,3,4-butanetetracarboxylate, 1-1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyltetramethylpiperidyl-O-succinate, the condensate of N,N'-bis(2,2,6,6-tetramethylpiperidin-4-yl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-bis(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(1-ethanoyl-2,2,6,6-tetramethylpiperidiii-4-yl) pyrolidin-2,5-dione, 3-dodecyl-1-(2,2,6,6-tetramethylpiperidin-4-yl)pyrrolidin-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensate of N,N'-bis(2,2,6,6-tetramethylpiperidin-4-yl)hexamethylenediamine and 4-cyclohexylamino-2,6-dichloro-1,3,5-triazine, the condensate of 1,2-bis(3-aminopropylamino)ethane, 2,4,6-dichloro-1,3,5-triazine and 4-butylamino-2,2,6,6-tetramethylpiperidine (CAS Reg. No. [136504-96-6]), N-(2',6,6-tetramethyl piperidine-4-yl)-n-dodecylsucciniimide, ˆ(Îˆjójó-pentamethylpiperidinˆ-yˆ-n-dodecylsuccinimide, 2-undecyl-7,7,9,9-tetramethyl-1-oxa-3,8-diaza-4-oxospiro[4.5]decane, oxo-piperanzinyl-triazines or so called PIP-T HALS, e.g., GOODRTTE® 3034, 3150, and 3159 commercially available from BF Goodrich Chemical Co. of Akron, Ohio, and similar materials disclosed in U.S. Pat. No. 5,071,981, photobondable HALS such as SANDUVOR® PR-31 AND PR-32 commercially available from Clariant Corp. of Charlotte, N.C., and similar materials disclosed in GB-A-2269819, the reaction product of 7,7,9,9-tetramethyl-2-cycloundecyl-1-oxa-3,8-diaza-4-oxospiro[4,5]decane and epichlorohydrin. Examples of the tetramethylpiperidine derived HALS include CYASORB® UV-3346 Light Stabilizer, commercially available from CYTEC INDUSTRIES, SANDUVOR® 3055 HALS, SANDUVOR® 3056 HALS, and SANDUVOR® 3058 HALS, commercially available from SANDOZ Corporation of Charlotte, N.C., CHMASORB® 944 Stabilizer, TINUVIN® 622 Stabilizer, and TINUV1N® 144 Stabilizer, each commercially available from CIBA SPECIALTIES, and mixtures thereof. See also generally U.S. Pat. Nos. 5,106,891, 4,740,542, 4,619,956, 4,426,471, 4,426,472, 4,356,307, 4,344,876, 4,314,933; GB-A-2269819, EP-A-309400, EP-A-309401, EP-A-309402 and EP-A-0434608, each of which is incorporated herein by reference in their entirety;

[6] thio type antioxidants, such as Dilauryl thiodiopropionate, Distearyl thiodiopropionate, 2,3,5-trimethyl-4-[(3,7-dimethyl-6-octenyl)thio]-, 1,2,3,5-trimethyl-4-[(3,7-dimethyl-6-octenyl)thio]-, (S)-Phenol, 2,3,5-trimethyl-4-[(3,7-dimethyl-6-octenyl)thio]-, distearyl 3,3'-tbiopropionate, dilauryl 3,3'-thiopropionate, ditridecylthiodipropionate, mixed lauryl-+stearylthiopropionate, esters of propanoic acid, thiobis[2,-(1,1-dimethylethyl-5-methyl-4,1-phenylene], (ADK stab AO 23 (CAS number 66534-05-2, 71982-66-6), pentaerytritol tetrakis (beta-lauryltbiopropionate); and

[7] polymerized 1,2-dihydro-2,2,4-trimethylquinoline, 2,4-bis(n-octylthio)-6-(4-hydroxy-3,5-di-t-butylanilino)-1,3,5-triazine, 4,4'-bis(α,α-dimethylbenzyl) diphenylamine, N-phenyl-styrenated benzenamine, diphenylamine/acetone reaction product, p-(p-toluene-sulfonylamido)-diphenylamine; and mixtures thereof.

Further long term stabilizers are listed in the 3rd edition (1990) and 5th edition (2001) of "Plastics Additive Handbook," Hanser Publishers. Additionally, the "Rubber Technology Handbook" by W. Hofmann, Hanser Publishers (1989), describes selected efficient long term stabilizers.

Other contemplated antioxidants for use in the compositions of the present invention include phenolic ester antioxidants such as benzenepropanoic acid, 3-(1,1-dimethylethyl)-4-hydroxy-5-methyl-, 1,2-ethanediylbis(oxy-2,1-ethanediyl) ester, and full or partial esters of a poly(vinylphenol) and a 3,5-di-tert-butylhydroxybenzoic acid.

A specific embodiment of the invention is a composition wherein the fast radical scavenger, is 4,6-bis(octylthiomethyl)o-cresol or derivatives thereof and is blended with a long term stabilizer of a highly hindered phenol, thiosynergist, aromatic amine, aliphatic amine, HALS, hydroxylamine, or mixtures thereof. For a structure derived from 4,6-bis(octylthiomethyl)o-cresol, see EP 1249845 A2.

The most preferred derivative is 2,4-bis(n-docecylthiomethyl)-6-methylphenol. Another preferred embodiment of the invention is a composition comprising the fast radical scavenger 4,6-bis(octylthiomethyl)o-cresol blended with the long term stabilizer 2,2'-thiodiethylene bis[3(3,5-di-t-butyl-4-hydroxyphenyl)propionate]. Another preferred embodiment of the invention is a composition comprising the fast radical scavenger 4,6-bis(octylthiomethyl)o-cresol blended with a long term stabilizing mixture comprising 2,2'-thiodiethylene bis[3(3,5-di-t-butyl-4-hydroxyphenyl)propionate] and distearyl 3,3'-thiopropionate or ditridecyl thiodipropionate. Another preferred embodiment of the invention is a composition comprising the fast radical scavenger 4,6-bis(octylthiomethyl)o-cresol blended with a long term stabilizer that comprises $C_{13}$-$C_{15}$ linear and branched alkyl esters of 3-(3',5'-di-t-butyl-4'-hydroxyphenyl) propionic acid. Another preferred embodiment of the invention is a composition comprising the fast radical scavenger 4,6-bis(octylthiomethyl)o-cresol blended with a long term stabilizer comprising a mixture of $C_{13}$-$C_{15}$ linear and branched alkyl esters of 3-(3',5'-di-t-butyl-4'-hydroxyphenyl) propionic acid and distearyl 3,3'-thiopropionate or ditridecyl thiodipropionate. Another preferred embodiment of the invention is a composition comprising the fast radical scavenger 4,6-bis(octylthiomethyl)o-cresol blended with a long term stabilizer selected from the group consisting of propanoic acid, 3-(tetradecylthio)-, thiobis[2,-(1,1-dimethylethyl)-5-methyl-4,1-phenylene]ester or propanoic acid, 3-(dodecylthio)-, thiobis[2,-(1,1-dimethylethyl)-5-methyl-4,1-phenylene]ester, and mixtures thereof (ADK stab AO 23 (CAS number 66534-05-2, 71982-66-6)). Another preferred embodiment of the invention is a composition comprising the fast radical scavenger 4,6-bis(octylthiomethyl)o-cresol a long term stabilizer selected from the group consisting of propanoic acid, 3-(tetradecylthio)-, thiobis[2,-(1,1-dimethylethyl)-5-methyl-4,1-phenylene]ester or propanoic acid, 3-(dodecylthio)-, thiobis[2,-(1,1-dimethylethyl)-5-methyl-4,1-phenylene]ester, and mixtures thereof (ADK stab AO 23) blended with distearyl 3,3'-thiopropionate or ditridecyl thiodipropionate. Another preferred embodiment of the invention is a composition comprising the fast radical scavenger 4,6 bis(octylthiomethyl)o-cresol blended with a long term stabilizer comprising a blend of ADK stab AO 23 and distearyl 3,3'-thiopropionate or ditridecyl thiodipropionate. Another preferred embodiment of the invention is a composition comprising the fast radical scavenger 4,6-bis(octylthiomethyl)o-cresol blended with a long term stabilizer comprising 4,4'-bis(a,a dimethylbenzyl)diphenylamine. Another preferred embodiment of the invention is a composition comprising the fast radical scavenger 4,6-bis(octylthiomethyl)o-cresol blended with a long term stabilizer comprising a mixture of 4,4'-bis(α,α-dimethylbenzyl) diphenylamine and distearyl 3,3'-thiopropionate or ditridecyl thiodipropionate. Another preferred embodiment of the invention is a composition comprising the fast radical scavenger 4,6-bis(octylthiomethyl)o-cresol blended with a long term stabilizer comprising a mixture of 4,4'-bis(α,α-dimethylbenzyl)diphenylamine and 2,2-thiodiethylene bis[3(3,5-di-t-butyl-4-hydroxyphenyl)propionate]. Another preferred embodiment of the invention is a composition comprising the fast radical scavenger 4,6-bis(octylthiomethyl)o-cresol blended with a long term stabilizer comprising a mixture of 4,4'-bis(α,α-dimethylbenzyl)diphenylamine and ADK stab AO 23. Another preferred embodiment of the invention is a composition comprising the fast radical scavenger 4,6-bis (octylthiomethyl)o-cresol blended with a long term stabilizer comprising NOR HALS with, but not limited to, examples as Tinuvin 123 or Tinuvin 116.

The present invention also includes the use of a stabilized peroxide cross-linked polyolefin composition as described herein as insulation media for medium and high voltage wire and cable. (For a description of a similar composition wherein the polyolefin is polyethylene, see EP 1074580 A2 and EP 0966000 A1.) The organic peroxides useful as cross-linking agents are those well known in the art, e.g., dialkyl peroxides such as dicumyl peroxide. The load level range for the peroxide is usually 0.5 to 5% by weight. (For a description of such a peroxide, see EP 1074580 A2 and EP 0966000 A1.)

The antioxidant blend can be added to the polymer as separate components, or as a pre-mixed powder blend, or as a pre-mixed no-dust blend (prepared by any process known in the art), or as a pre-dispersed blend in a polymer masterbatch or as premixed liquid blend. (For a description of appropriate processing equipment, see EP 1074580 A2 and EP 0966000 A1).

The blending of different types of antioxidants results in a tailor-made antioxidant system for peroxide cross-linked polyethylene having excellent scorch resistance, minimal peroxide interaction, sufficient long term properties to meet industry standards, a high solubility, and low melting behavior. It is to be noted that some of the antioxidants mentioned as being suitable components for the present invention have multi-functional properties, for example: (i) 4,6-bis(octylthiomethyl)o-cresol is classified for purposes of the invention as a fast radical scavenger because it is a low hindered phenol. However, it also contains sulphur, which contributes to the long term properties. (ii) 2,2'-thiodiethylene bis[3,(3,5-di-t-butyl-4-hydroxyphenyl)propionate] is a highly hindered phenol that also contains sulphur. However, in this case both contribute mainly to the long term stabilizer properties. (iii) The highly hindered phenols and thiosynergists are actually two different classes of antioxidants, but both exhibit the concept of the present invention in that they both contribute mainly to the long term stabilizer properties of the cross-linked polyethylene and somewhat to the anti-scorch property. Taking the above into account, for purposes of the present invention, the fast radical scavengers can be regarded as anti-scorch agents, and the highly hindered phenols and thiosynergists can be regarded as having the main function of long term stabilizers (even though they might also contribute to the anti-scorch properties).

Other Ingredients

Other additives commonly employed in the polyolefin compositions utilized in the invention can include, for example, crosslinking agents, processing aids, pigments, dyes, colorants, metal deactivators, oil extenders, stabilizers, and lubricants.

Processing

All of the components of the compositions utilized in the invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

In a preferred embodiment of the invention the additives are premixed with a small amount of polymer in a master batch. This master batch is added at the cable making extruder such that for example 10% master batch is added with 90% base polymer such that the resulting 100% mixture contains the additives in the desired quantity. In this way the cost of mixing is only attached to about 10% of the total composition.

In this embodiment or other embodiments preferably the organic peroxide is not premixed with the polymer. The peroxide is injected into the cable making extruder in the desired quantity and it mixes with the polymers and or master batches while they are melted and extruded. This avoids a second costly and time consuming mixing or absorbing step with the polymers and or master batches before cable making.

After the various components of the composition are uniformly admixed and blended together, they are further processed to fabricate the cables of the invention. Prior art methods for fabricating polymer insulated cable and wire are well known, and fabrication of the cable of the invention may generally be accomplished any of the various extrusion methods.

In a typical extrusion method, an optionally heated conducting core to be coated is pulled through a heated extrusion dies, generally a cross-head die, in which layers of melted polymer are applied to the conducting core. Upon exiting the dies, the conducting core with the applied polymer layers is passed through a heated vulcanizing section, or continuous vulcanizing section and then a cooling section, generally an elongated cooling bath, to cool. Multiple polymer layers may be applied by consecutive extrusion steps in which an additional layer is added in each step, or with the proper type of die, multiple polymer layers may be applied simultaneously.

The polyolefin compositions can be vulcanized using traditional curing procedures, such as chemical, thermal and radiation procedures. The curing agent can be a hydrolysable silane compound such as vinyl tri-methoxy silane grafted to the polymer backbone with an organic peroxide or grafted during polymerization of the polymer. The curing agents employed in the present invention can be organic peroxides, dicumyl peroxide and bis(terbutylperoxy)diisopropylbenzene. The peroxides act by decomposing at the cure temperature to form free radicals which then abstract a hydrogen from adjacent polymer molecules allowing the polymers to bond covalently to each other. To select the curing agents it is necessary to take into account the decomposition temperatures of said agents, in order to avoid undesirable problems during the mixture and extrusion processes. The curing agent amounts and/or ratios to be used will be defined based on the type of application. They are also based on their compatibility with and or interference with the additive system.

The conductor of the invention may generally comprise any suitable electrically conducting material, although generally electrically conducting metals such as copper or aluminum.

EXAMPLES

Example 1

Description of Master Batches and Formulas

The manufacturing of masterbatches or formulas was done in two steps: premixing additives with polyethylene pellets, dispersing additives into molten polyethylene, and pelletizing. At the premixing stage, antioxidant, PEG and Hals were premixed in a 55 gallon tumble-blender for 30 minutes, and then polyethylene LD 419 pellets were added to the mixture and all ingredients were mixed for another 30 minutes. The premixing composition was fed to an L/D 24:1 intermeshing co-rotating twin-screw extruder to make the insulation materials. The melting temperature was maintained at 324° F., and the screw speed maintained 150-180 rpm. The finished insulation compounds was pelletized through a 24 hole strand Pelletier die. The following materials were used:

Polymers

ExxonMobil LDPE, LD 419.MV, a polyethylene homopolymer, CAS number 9002-88-4, melt index 2.25 g/10 min, density 0.921 g/cm$^3$, peak melting temperature 228° F. (109° C.). LD 419 MV is designed for wire and cable applications and suitable for making crosslinkable compounds for medium voltage insulation. Manufactured by ExxonMobil Chemical, Baton Rouge, La.

Petrothene NA951 080, a natural, low density, medium molecular weight polyethylene homopolymer resin containing no additives. CAS number 9002-88-4, Melt index 2.2 g/10 min, density 0.919 g/cm$^3$, melting point 280° F. (138° C.). It provides excellent processability over a wide range of extrusion conditions, including the low melt temperature requirements of specialty applications like crosslinkable or foam extrusion. Manufactured by Equistar Chemicals, Houston, Tex.

Exact 4049, an ethylene-olefin copolymer, odorless opague white pellets, melt index 4.5 g/10 min, density 0.873 g/cm$^3$, peak melting temperature 131° F. (55° C.), crystallization point 106° F. (41° C.). It provides good performance like excellent elastic recovery/snap back, low stress relaxation, low thermal bonding temperatures. Manufactured by ExxonMobil Chemical, Baton Rouge, La.

Antioxidants

Irganox 1035, Thiodiethylene bis(3,5-di-(tert)-butyl-4-hydroxyhydrocinnamate (CAS number 41484-35-9), melting range 63-78° C., bulk density 530-630 g/l. Irganox 1035 is an antioxidant and heat stabilizer for wire and cable applications. It is a sulfur containing primary (phenolic) antioxidant and heat stabilizer used for the process stabilization of polyethylene wire and cable resins. Manufactured by Ciba Specialty Chemicals Corp., Tarrytown, N.Y.

Irganox 245, Ethylenebis(oxyethylene)bis-(3-(5-tert-butyl-4-hydroxy-m-tolyl)-propionate), CAS number 36443-68-2: melting range 76-79° C., specific gravity (20° C.) 1.14 g/cm$^3$. Irganox 245 is a sterically hindered phenolic antioxidant particularly suitable for organic substrates. It protects substrates against thermo-oxidative degradation during manufacturing, processing and end-use. Irganox 245 is odorless, of low volatility, has a good color stability and exhibits high extraction resistance. Manufactured by Ciba Specialty Chemicals Corp., Tarrytown, N.Y.

Agerite resin D, Quinoline, 1,2-dihydro-2,2,4-trimethyl homopolymer. CAS number 26780-96-1. Melting point 82-102° C., specific gravity 1.06. Agerite resin D is a non-blooming antioxidant, it retards oxidation and heat deterioration under even the most severe conditions and increases curing activity of CR. R.T. Manufactured by Vanderbilt Company, Inc., Norwalk, Conn., CT.

Irganox PS 802, Dioctadecyl 3,3'-thiodipropionate. CAS number 693-36-7. Melting range 64-67° C., bulk density (FL form) 400-450 g/l. Irganox PS 802 is used as a heat stabilizer in combination with a primary phenolic antioxidant as thio-synergist heat stabilizer. It improves the long-term heat stability of polymers at the levels of 0.05-1%. Manufactured by Ciba Specialty Chemicals Corp., Tarrytown, N.Y.

Irgastab cable KV 10, 4,6-bis(octylthiomethyl)-o-cresol. CAS number 110553-27-0, melting range ~14° C., density (20° C.) 0.98 g/cm$^3$. Irgstab Cable KV 10 is a liquid, sulphur-containing, high performance primary (phenolic) antioxidant and heat stabilizer for the base stabilization of polyethylene wire and cable resins. It improves processability of MV/HV power cable compounds and extends performance of the cable insulation. It enables simultaneous additiviation of peroxide and antioxidant as a liquid. Manufactured by Ciba Specialty Chemicals Corp., Tarrytown, N.Y.

Vestowax AV 5012, Ethylene-vinylacetate copolymer wax. Drop point 99-104° C., Viscosity at 140° C., vinylacetate content 12-14%, density (20° C.) 0.87-1.0 g/cm$^3$, thermal decomposition 250-300° C. Manufactured by Degusa Corporation, Parsippany, N.J.

PolyglyKol 20000, polyethylene glycol, is a white waxy solid at room temperature. Its two hydroxyl end groups as well as its ether groups mainly control the physical and chemical properties. Manufactured by Clariant Corporation, Mount Holly, N.C.

HALS

Chimassorb 944 LD, Poly[[6-[(1,1,3,3-tetramethylbutyl)amino]-1,3,5-triazine-2,4-diyl][2,2,6,6-tetramethyl-4-piperidinyl)imino]-1,6-hexanediyl[2,2,6,6-tetramethyl-4-piperidinyl)imino]]), CAS number 71878-19-8, molecular weigh Mn=2000-3100 g/mol, melting range 100-135° C., specific gravity (20° C.) 1.01 g/cm$^3$, bulk density 450-550 g/l. Chimassorb 944 is a high molecular weight hindered amine light stabilizer (HALS). It shows excellent compatibility, high resistance to extraction and low volatility. It is highly effective as a long-term thermal stabilizer in thin and thick articles and shows good extraction resistance. Manufactured by Ciba Specialty Chemicals Corp., Tarrytown, N.Y.

Peroxide

Di-cup, dicumyl peroxide, is a white to pale yellow granular solid. Melting point 100° F. (38° C.), specific gravity 1.02 (at 25° C.). It is used as high temperature crosslinking agent. Manufactured by GEO Specialty Chemicals, Inc., Gibbstown, N.J.

Trigonox 101, 2,5-dimethyl-2,5-di-(tert-butylperoxy)hexane, CAS number 78-63-7, melting temperature 46.4° F. (8° C.), Density 0.865 (at 25° C.). Trigonox 101 is a clear, light-yellow liquid with a faint odor. Manufactured by Akzo Nobel Polymer Chemicals LLC, Chicago, Ill.

Example 2

Description of Peroxide Injection Process

The peroxide injection system is shown in FIG. 1. If solid dicumyl peroxide is used, it must be melted in peroxide container in a 130° F. hot bath prior to injection. Melt dicumyl peroxide or liquid trigonox 101 peroxide with or without liquid Irgastab Cable KV 10 is dosed to polyethylene, if no masterbatch is added, by pumping them directly into the hopper by means of stroke head, located in the bottom part of the hopper. The peroxide injection speed is automatically adjusted by injection control panel based on the primary insulation extruder speed. The spray method provides good mixing of the liquid additives with polyethylene at an early stage. Coarse mixing takes place when the additives are directly introduced into the hopper, followed by intensive mixing in the melting zone and especially in the mixing zone of the extruder.

Example 3

Square Wire Tests

Square 14 gauge copper conductor wires with 30 mils of insulation were extruded with a 20:1 LD Davis standard extruder and a crosshead die and cured in steam at 400° F. Eight to ten 25 inch samples of these insulated square conductor wires were placed in a 75° C. water bath and energized with 7500 volts. Time to short circuit was recorded. The purpose of the square conductor is to create an electrical stress concentration at each corner and accelerate time to failure.

Accelerating Cable Life Test (ACLT)

The power cables tested were prepared in accordance with the formulations listed in Table 1. The cables had a 1/0 19 wire stranded aluminum conductor surrounded by 15 mils of a conductor shield, surrounded by either 60 or 175 mils of polyethylene insulation as specified in Table 1 (representing the parts by weight) surrounded by 35 mils. of semiconductive insulation shield. A copper mesh was then wrapped around the insulation shield to provide the ground path for the shortout in the test. The conductor shield was extruded first and then the insulation and outer shield components were extruded over the conductor at one time on a Davis standard tandem extruder and dry cured under pressurized nitrogen in a continuous catenary vulcanization tube and water cooled. Table 1 provides the composition of the insulation materials in each of the tested cables.

The Comparative Example cables and samples of cables made according to the invention were prepared for the test. Samples were preconditioned for 72 hours at a 90° C. conductor temperature in free air. The center of each sample was immersed in 50° C. water. The cable conductor temperature in the water was maintained at 75° C. for 8 hours each 24 hour period. For the remaining 16 hours, the heating current was turned off. The samples were energized at four times normal voltage stress (34.6 kv) until all test samples failed.

The failure times were analyzed using extreme value distribution statistics (Weibull) to assess comparative mean life equivalency or enhancements versus control(s). For the Weibull distribution, the distribution parameters are ETA ($\alpha$), the scale parameter and data ($\beta$), the shape parameter. The scale parameter measures the relative scope or largeness of the variable in question (life in days) while the shape parameters measures the variation (or range min. to max.) in the individual data (failure times) results of the population is sample. Both parameters of the test population best fit distribution were compared to a controlled population. Results of the ACLT are shown in Table 2.

TABLE 1

| | Formulations |
|---|---|
| Formula 1 | 98.80% LD419, 0.8% PEG, 0.4% KV10 |
| Formula 2A | 98.65% NA951, 0.90% PEG, 0.22% PS802, 0.22% Irganox 1035 |
| Formula 3 | 98.70% LD419, 0.80% PEG, 0.2% Irganox 245 and 0.3% Chimassorb 944 |
| Formula 5 | 98.70% LD419, 0.80% PEG, 0.2% Agerite D and 0.3% Chimassorb 944 |
| Formula 5A | 98.70% NA951, 0.80% PEG, 0.2% Agerite D and 0.3% Chimassorb 944 |
| Formula 6 | 97.50% LD419, 2.0% Vestowax AV5012, 0.2% Irganox 245, 0.3% Chimassorb 944 |
| Formula 8 | 60% Exact 4049/39.6% LD419, 0.4% KV10 |
| Formula 9 | 97.50% LD419, 2.0% Vestowax AV5012, 0.2% Agerite D, 0.3% PS802 |
| Formula 11 | 99.6% LD419, 0.40% KV10 |
| XLWC 088 | Equistar 420 |
| Formula 14 | 94.6% LD 419, 5% Exact 4049, 0.4% KV10, ITC. |
| Formula 15 | 89.6% LD 419, 10% Exact 4049, 0.4% KV10, ITC. |
| MB Formula 3 | 89.5% LD 419, 7.5% PEG, 1.5% Irganox 1035, 1.5% Chimmasorb 944 |
| MB Formula 6 | 82% LD 419, 12.5% AV 5012, 1.5% Irganox 245, 1.5% Chimmasorb 944 |
| Formula 19 | 97.6% LD 419, 2% Dicup LKB 1.5, 0.4% KV10 |
| Formula 20 | 97.6% LD 419, 2% AV 5012, 0.4% KV10 |
| Formula 21 | 94.6% LD 419, 5% AV 5012, 0.4% KV10 |

TABLE 2

TRXLPE Square Wire Test Data (Hours)

| Insulation | 1st | 2nd | 3rd | 4th | 5th | 6th | 7th | 8th | 9th | 10th | 11th | 12th |
|---|---|---|---|---|---|---|---|---|---|---|---|---|
| HFDB4202 | 207 | 430 | 587 | 604 | 618 | 680 | 686 | 694 | 696 | 742 | 759 | 782 |
| B4202 ACLT | 249 | 274 | 258 | 353 | 360 | | | | | | | |
| EQ XLWC088 | 68.2 | 116 | 189.9 | 263 | 263 | 268 | 278 | 278 | 278.6 | 296 | 301 | 329.5 |
| Formula 1 | 319.5 | 324 | 342 | 380 | 390 | 413 | 429 | 436 | 438 | 439 | 440 | 441 |
| Formula 2A | 618 | 734 | 839 | 872 | 879 | 886 | 889 | 895 | 900 | 909 | 909 | 919 |
| Formula 3 | 1 | 230.6 | 846 | 1331 | 1420 | 1570 | 1587 | 1665 | 1666 | 1674 | 1674 | 1674 |
| MB 3 ACLT | 433 | | | | | | | | | | | |
| Formula 5 | 961 | 1280 | 1891 | 2394 | 2659 | 2676 | 2704 | 2970 | 3031 | 3240 | 3530 | 3657 |
| Formula 5A | 1701 | 2158 | 2176 | 2263 | 2465 | 3069 | 3241 | 3750 | 3755 | 3929 | 4082 | 4390 |
| Formula 6 | 990 | 1040 | 1692 | 1777 | 1798 | 1853 | 1906 | 1915 | 2185 | 2211 | 2344 | 3415 |
| MB 6 ACLT | 258 | | | | | | | | | | | |
| Formula 8 | 809 | 820 | 970 | 1028 | 1040 | 1427 | 1568 | 1585 | 1640 | 1666 | 1692 | 1748 |
| Formula 9 | 0.1 | 128 | 420 | 431 | 434 | 578 | 627 | 638 | 679 | 731 | 740 | 766 |
| Formula 11 | 127 | 178 | 183 | 195 | 198 | 207 | 232 | 263 | 374 | 404 | 416 | 418 |
| Formula 14 | 160 | 226 | 259 | 301 | 329 | 329 | 342 | 350 | 353 | 357 | 362 | 363 |
| Formula 15 | 89 | 342 | 346 | 393 | 405 | 408 | 418 | 441 | 462 | 464 | 465 | 469 |
| Formula 19 | 345 | 355 | 364 | 401 | 411 | 424 | 443 | 458 | 460 | 462 | 523 | 530 |

TABLE 2-continued

TRXLPE Square Wire Test Data (Hours)

| Formula | | | | | | | | | | | | |
|---|---|---|---|---|---|---|---|---|---|---|---|---|
| Formula 20 | 109 | 308 | 399 | 517 | 535 | 586 | 807 | 853 | 873 | 888 | 912 | 953 |
| Formula 21 | 330 | 342 | 563 | 592 | 642 | 801 | 942 | 945 | 953 | 1001 | 1019 | 1112 |

| Insulation | 13th | 14th | 15th | 16th | 17th | 18th | 19th | 20th | Eta | Adhesion |
|---|---|---|---|---|---|---|---|---|---|---|
| HFDB4202 B4202 ACLT | 804 | 805 | 818 | 822 | 835 | 858 | 858 | 869 | 693 329 | 17 |
| EQ XLWC088 | 335.3 | 336.7 | 358.7 | 365.1 | 373.9 | 378 | 420 | 491 | 331 | |
| Formula 1 | 444 | 452 | 458 | 497 | 505 | 530 | 549 | 558 | 467 | 14 |
| Formula 2A | 952 | 967 | 976 | 987 | 1029 | 1032 | 1032 | 1060 | 946 | 17 |
| Formula 3 MB 3 ACLT | 1676 | 1749 | 2148 | 2165 | 2239 | 2239 | 2280 | 3381 | 2249 | 17 |
| Formula 5 | 4068 | 4304 | 4333 | TEM | TEM | TEM | TEM | TEM | 4772 | 19 |
| Formula 5A | 4638 | TEM | TEM | TEM | TEM | TEM | TEM | TEM | 6001 | |
| Formula 6 MB 6 ACLT | 4639 | 5086 | 5622 | 5625 | 6285 | 7161 | TEM | TEM | 6825 | 15 |
| Formula 8 | 1766 | 1798 | 2080 | 2703 | 2764 | 2835 | 3207 | 4638 | 2058 | 23 |
| Formula 9 | 769 | 794 | 845 | 871 | 902 | 906 | 961 | 1025 | 821 | 11 |
| Formula 11 | 437 | 444 | 458 | 494 | 510 | 545 | 551 | 561 | 488 | |
| Formula 14 | 373 | 414 | 478 | 513 | 525 | 563 | 566 | 566 | 443 | |
| Formula 15 | 504 | 504 | 520 | 533 | 561 | 561 | 869 | 893 | 566 | |
| Formula 19 | 562 | 591 | 630 | 632 | 642 | 813 | 815 | 821 | 647 | |
| Formula 20 | 958 | 1000 | 1010 | 1024 | 1035 | 1040 | 1089 | 1107 | 1029 | |
| Formula 21 | 1116 | 1161 | 1233 | 1322 | 1355 | 1509 | 1608 | 1791 | 1445 | |

Comparative example Formula 1 contains PEG tree retardant and an improved antioxidant known in the art to be suitable for tree retardant polyethylene. Comparative example Formula 2 contains PEG tree retardant and an antioxidant combination known in the art to be suitable for tree retardant polyethylene. Comparative example Formula DF4202 is a commercial PEG tree retardant polyethylene from the Dow chemical company. Comparative example XLWC085 is a "co polymer" tree retardant polyethylene from the Equistar chemical company.

Example of the invention Formula 3 contains PEG and an inventive antioxidant combination. While it is known in the art to use this combination in electrical insulation it is not know to use them with PEG to achieve electrical performance better than is known in the art.

Example of the invention formulas 5 and 5A contain PEG and an inventive antioxidant combination. While it is known in the art to use HALS in electrical insulation it is not know to use it with an amine antioxidant with PEG to achieve electrical tree resistant performance better than is known in the art. It is known in the art that HALS and an amine antioxidant can reduce dissipation factor of certain polymers.

Example of the invention formulas 6 and 9 contain a copolymer wax and an inventive antioxidant combination. "Co-polymer" insulations containing various polar polymers are know but they have drawbacks such as higher dissipation factor, high adhesion to the outer semiconductive shield and opacity when heated (in cable production the outer semiconductive shield is removed and the cable is heated to melt and make transparent the insulation to observe the quality of the inner semiconductive layer). The inventive copolymer wax advantageously gives lower adhesion of the outer semiconductive screen, is transparent and gives electrical performance better than is known in the art.

Example of the invention formula 9 gives electrical performance equal to than is known in the art but has several advantages. It is more flexible than even EPR. The composition requires no separate compounding or master batching step. The polymer, KV10 antioxidant and cross linking agent can be added directly at the cable making extruder. This reduces cost and also chances for contamination at compounding or master batching.

While the present invention has been described and illustrated by reference to particular embodiments thereof, it will be appreciated by those of ordinary skill in the art that the invention lends itself to variations not necessarily illustrated herein.

For this reason, then, reference should be made solely to the appended claims for the purposes of determining the true scope of this invention.

What is claimed is:

1. A process for making an electric cable having an insulation composition comprising:
    (a) a base polymer comprising polyolefin; and
    (b) an additive comprising a blend of:
        (i) at least one amine antioxidant, and
        (ii) at least one hindered amine light stabilizer, and
        (iii) polyethylene glycol;
    the process comprising:
    forming a masterbatch of the additives and a first amount of the polyolefin;
    adding the masterbatch to a second amount of polyolefin at a cable making extruder; and adding peroxide at the cable making extruder at a temperature less than the decomposition temperature of the peroxide.

2. The process for making an electric cable of claim 1, wherein the first amount of polyolefin is about 10% of the total amount of polyolefin used in making the cable.

3. The process for making an electric cable of claim 1, wherein the peroxide is selected from the group consisting of: organic peroxides, dicumyl peroxide and bis(terbutylperoxy) diisopropylbenzene.

4. A process for making an electric cable having an insulation composition comprising:
   (a) a base polymer comprising polyolefin,
   (b) a sulfur containing phenolic antioxidant, and
   (c) polyethylene glycol;
   the process comprising:
   forming a masterbatch of the sulfur containing phenolic antioxidant, the polyethylene glycol and a first amount of the polyolefin;
   adding the masterbatch to a second amount of polyolefin at a cable making extruder; and
   adding peroxide at the cable making extruder at a temperature less than the decomposition temperature of the peroxide.

5. The process for making an electric cable of claim 4, wherein the first amount of polyolefin is about 10% of the total amount of polyolefin used in making the cable.

6. The process for making an electric cable of claim 4, wherein the peroxide is selected from the group consisting of: organic peroxides, dicumyl peroxide and bis(terbutylperoxy) diisopropylbenzene.

7. A process for making an electric cable having an insulation composition comprising:
   (a) a base polymer comprising polyolefin; and
   (b) an additive comprising;
      (i) a thio type antioxidant; and
      (ii) a low molecular weight wax;
   the process comprising:
   forming a masterbatch of the additives and a first amount of the polyolefin;
   adding the masterbatch to a second amount of polyolefin at a cable making extruder; and
   adding peroxide at the cable making extruder at a temperature less than the decomposition temperature of the peroxide.

8. The process for making an electric cable of claim 7, wherein the first amount of polyolefin is about 10% of the total amount of polyolefin used in making the cable.

9. The process for making an electric cable of claim 7, wherein the peroxide is selected from the group consisting of: organic peroxides, dicumyl peroxide and bis(terbutylperoxy) diisopropylbenzene.

10. A process for making an electric cable having an insulation composition comprising:
    (a) a base polymer comprising polyolefin; and
    (b) an additive comprising a blend of:
       (i) at least one phenolic ester antioxidant, and
       (ii) at least one hindered amine light stabilizer, and
       (iii) polyethylene glycol;
    the process comprising:
    forming a masterbatch of the additives and a first amount of the polyolefin;
    adding the masterbatch to a second amount of polyolefin at a cable making extruder; and
    adding peroxide at the cable making extruder at a temperature less than the decomposition temperature of the peroxide.

11. The process for making an electric cable of claim 10, wherein the first amount of polyolefin is about 10% of the total amount of polyolefin used in making the cable.

12. The process for making an electric cable of claim 10, wherein the peroxide is selected from the group consisting of: organic peroxides, dicumyl peroxide and bis(terbutylperoxy) diisopropylbenzene.

* * * * *